United States Patent Office.

JOHN P. SCHENCK, JR., OF MATTEAWAN, NEW YORK.

Letters Patent No. 60,944, dated January 1, 1867.

IMPROVED COMPOSITION FOR LINING OIL BARRELS.

The Schedule referred to in these Letters Patent and making part of the same.

TO ALL WHOM IT MAY CONCERN:

Be it known that I, JOHN P. SCHENCK, Jr., of Matteawan, in the county of Dutchess, and State of New York, have invented a new and improved Composition for Coating or Lining Oil Barrels; and I do hereby declare that the following is a full, clear, and exact description thereof, which will enable others skilled in the art to fully understand and make use of the same.

The object of my invention is to furnish a cheap, effective, and reliable means for lining oil barrels, and for similar uses, so as to prevent leakage or evaporation, and which shall at the same time be so elastic as not to be cracked or injured by the spring of the staves in handling the barrels; and it consists of a composition prepared from the ingredients in the proportions and in the manner hereinafter more fully described.

In the preparation of this composition, I dissolve glue in acetic acid, in a suitable vessel, in the proportions of one ounce of glue to one ounce of acetic acid, and let them stand for twelve hours, with occasional stirring. In case the glue is not fully dissolved, the application of a small quantity of heat may be necessary; the necessity of the application of heat depending upon the purity of the ingredients. I then add water, in the proportion of three ounces of water to one ounce of glue and one ounce of acid, at the same time stirring the mixture. After it has become cold, I add lime and carbonate of iron, in the proportion of one ounce of each to the proportions of the other ingredients hereinbefore given, and the composition is then ready for use. In applying this composition to the interior of barrels or other vessels, I put a sufficient quantity of the composition into the vessel to coat its entire inner surface, and then turn the said vessel into various positions, so that the composition may come in contact with the whole of its interior surface, filling the crevices and forming a coating over the whole surface. The surplus of the composition is then poured out into a suitable receiving vessel, to be again used, and the vessel is then allowed to stand about twelve hours, to become thoroughly dry. One or more additional coatings may then be applied in the same manner, if the first one is found not to be sufficient. Outside coatings may be applied with a brush, which mode of application may also be used in case of vessels the shape of which is such as to give convenient access to their interiors.

I claim as new, and desire to secure by Letters Patent—

An improved composition for lining and coating the interior of oil barrels and other surfaces, formed of glue, acetic acid, water, lime, and carbonate of iron, combined with each other in the proportions and in the manner herein specified and described.

The above specification of my invention signed by me this 20th day of November, 1866.

JOHN P. SCHENCK, JR.

Witnesses:
WM. F. McNAMARA,
JAMES T. GRAHAM.